United States Patent [19]

Allen

[11] Patent Number: 4,588,978
[45] Date of Patent: May 13, 1986

[54] REMOTE SWITCH-SENSING SYSTEM

[75] Inventor: Henry V. Allen, Fremont, Calif.

[73] Assignee: Transensory Devices, Inc., Fremont, Calif.

[21] Appl. No.: 622,784

[22] Filed: Jun. 21, 1984

[51] Int. Cl.[4] ............................................. B60C 23/00
[52] U.S. Cl. .................................... 340/58; 73/146.5; 200/61.25
[58] Field of Search .................. 340/58, 870.31, 539; 73/146.5, 146.2; 200/61.22, 61.25; 343/6.5 SS, 6.8 R, 6.5 R

[56] References Cited

U.S. PATENT DOCUMENTS

| 2,274,557 | 2/1942 | Morgan et al. | 340/58 |
|---|---|---|---|
| 3,723,966 | 3/1973 | Mueller et al. | 340/58 |
| 3,858,174 | 12/1974 | Harris | 340/58 |
| 4,057,783 | 11/1977 | Blanchier | 340/58 |
| 4,074,227 | 2/1978 | Kalmus | 340/58 |
| 4,103,283 | 7/1978 | Lee | 340/58 |
| 4,450,431 | 5/1984 | Hochstein | 340/58 |

Primary Examiner—James L. Rowland
Assistant Examiner—Thomas J. Mullen, Jr.
Attorney, Agent, or Firm—Fitch, Even, Tabin & Flannery

[57] ABSTRACT

A system for monitoring vehicle tire pressure, or the like. The system includes a transmitter and a receiver mounted on the vehicle body, and magnetically coupled inductor and enhancer circuits carried on the vehicle wheel. The inductor circuit contains an open/closed condition switch which is responsive to tire pressure. The transmitter signal, acting through the inductor and enhancer circuits, produces a response voltage in the receiver which varies at a selected transmitter frequency according to the condition of the switch. In one embodiment of the invention, the inductor and enhancer circuits are tuned to enhance the response voltage in the receiver, at a selected transmitter frequency and at one inductor circuit switch condition. In a second embodiment, the inductor and enhancer circuits are tuned to produce receiver signals which have one signal-to-noise ratio peak at one transmitter frequency and with the pressure switch in one condition, and a second signal-to-noise ratio peak, at a second transmitter frequency and with the switch in its other condition.

22 Claims, 10 Drawing Figures

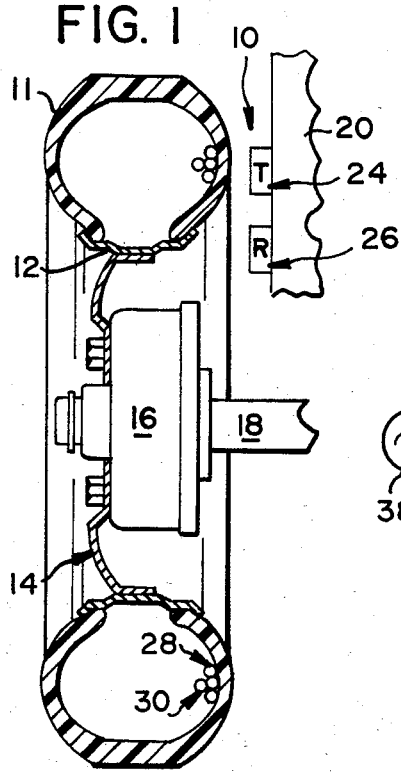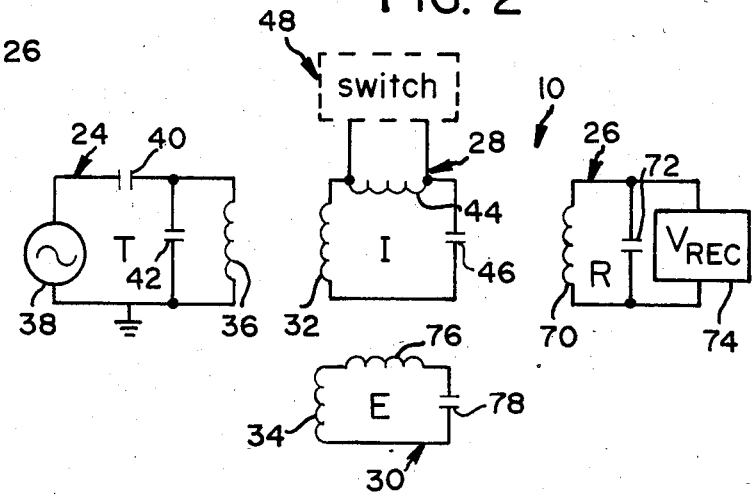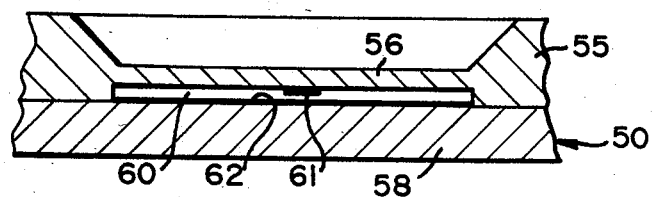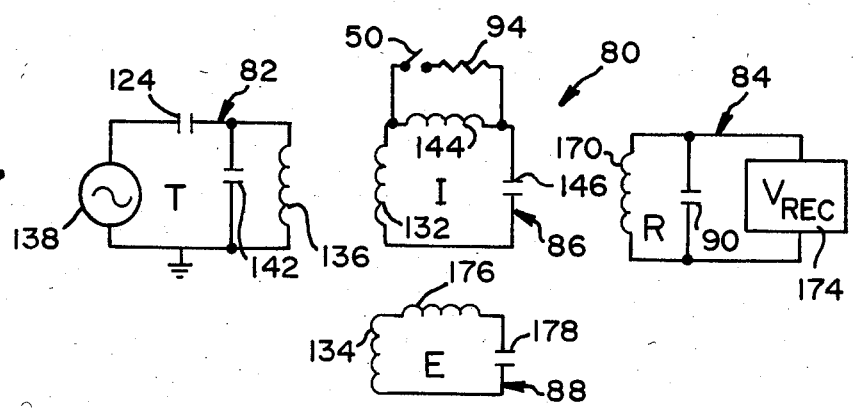
FIG. 1 FIG. 2 FIG. 3 FIG. 4 FIG. 5 FIG. 6 FIG. 7

REMOTE SWITCH-SENSING SYSTEM

BACKGROUND AND SUMMARY

The present invention relates to a system for monitoring the condition of a switch such as a pressure-responsive switch in a vehicle tire.

Remote switch monitoring systems for determining a physical condition have been proposed in the prior art. Many of the proposed systems are designed particularly for monitoring pressure in a vehicle tire. Generally, these systems include a transmitter and receiver mounted on a vehicle body and, carried on a wheel in the vehicle, a passive-response switch circuit which responds to either a low or high pressure condition in the tire. Inductive coupling between the vehicle and wheel-mounted circuits produces a receiver signal whose characteristics are indicative of the state of the switch in the switch circuit. The system can therefore be used to inform the vehicle operator of a change in tire pressure, typically the loss of pressure in the tire.

One such prior art device for monitoring vehicle tire pressure is disclosed in U.S. Pat. No. 2,274,557 to Morgan, et al. The device, which incorporates the transmitter, receiver and switch elements of the type mentioned above, employs a pressure responsive variable capacitor to vary resonance characteristics of the switch circuit in response to tire pressure changes. U.S. Pat. No. 4,074,227 to Kalmus describes a similar type of system in which a passive wheel-mounted switch circuit is constructed to respond to a transmitter modulating frequency only at the closed condition of a pressure-response switch in the circuit. A similar type of tire pressure indicator is shown in U.S. Pat. No. 3,723,966 to Mueller, et al.

A variety of coil configurations for producing inductive coupling between the vehicle and wheel mounted circuits have been proposed. U.S. Pat. No. 4,057,783 to Blanchier describes a remote switch-condition sensor containing magnetically coupled transmitter and receiver coils. Each of these coils is adapted to be inductively coupled to one of a pair of inductor coils in a wheel-mounted switch circuit, such that when a pressure-responsive switch in the circuit assumes a closed condition the effective coupling between the transmitter and receiver coils is changed. In U.S. Pat. No. 4,103,283 to Lee, strong coupling between the coils in a vehicle-mounted transceiver unit and a wheel-mounted switch circuit is effected by the use of ferromagnetic-core coil windings. A change in the switch condition in the switch circuit produces a resonance shift in the transceiver unit, to indicate a change in the switch state.

The present invention includes a remote switch monitoring system which provides unique advantages over prior art remote sensing devices. One important advantage provided by the present invention is enhanced signal induction in a receiver unit in the system due to the presence of a novel enhancer circuit in the system. This feature allows sensitive, reliable signal detection without the need for heavy ferromagnetic cores in the system's circuit coils for producing strong coupling between circuits in the system. Another advantage of the present invention is the ability to produce one receiver signal when an open/closed condition switch in the system is in one condition, by exciting the system at one transmitter frequency, and to produce a second receiver signal when the switch is in its other condition, by exciting the system at a second transmitter frequency. This feature potentially allows both conditions of the switch to be actively monitored at all times during the vehicle operation.

It is a general object of the present invention to provide a remote switch monitoring system which provides the advantages just named.

A more specific object of the invention is to provide such a system for use in monitoring vehicle tire pressure.

Yet another object of the invention is to provide such a device which is relatively inexpensive, easily maintained and reliable.

Broadly, the system of the invention includes a transmitter and a receiver mounted on a first body, such as a vehicle, and magnetically coupled inductor and enhancer circuits carried on a second body, such as a wheel of the vehicle. The inductor circuit contains an open/closed condition switch which is responsive to an environmental condition of the second body, such as a pressure-responsive switch responsive to the pressure of a tire carried on the wheel. The transmitter signal, acting through the inductor and enhancer circuits, produces a frequency-dependent response signal in the receiver whose characteristics are indicative of the condition of the switch in the inductor circuit.

In one embodiment of the invention, the inductor and enhancer circuits are tuned to enhance the response voltage in the receiver, at a selected transmitter frequency and inductor circuit switch condition. In a second embodiment of the invention, the inductor and enhancer circuits are tuned to produce one receiver signal-to-noise peak, at one transmitter frequency and with the switch in one condition, and a second receiver signal-to-noise peak, at a second transmitter frequency and with the switch in its other condition.

These and other objects and features of the invention will become more fully apparent when the following detailed description of the invention is read in conjunction with the accompanying drawings.

DESCRIPTION OF THE DRAWINGS

FIG. 1 illustrates, somewhat schematically, the arrangement of a transmitter, receiver and inductor and enhancer circuits in a remote-switch monitoring system constructed according to the invention and designed for monitoring the pressure of a vehicle tire;

FIG. 2 is a schematic diagram of transmitter, receiver, and inductor and enhancer circuits in one embodiment of the system of the present invention;

FIG. 3 shows, in diagramatic form, magnetically coupled coils in the transmitter (T), receiver (R), and inductor (I) and enhancer (E) circuits in the FIG. 2 system;

FIG. 4 is a schematic diagram of one type of switch element employed in the FIG. 2 system, designed for monitoring a closed-switch condition;

FIG. 5 is a schematic diagram of another type of switch element employed in the FIG. 2 system, designed for monitoring an open-switch condition;

FIG. 6 is a side-sectional view of a silicon diaphragm switch of a type usable in the present invention for detecting a threshold pressure level;

FIG. 7 is a schematic diagram like that of FIG. 2, showing transmitter, receiver, and inductor and enhancer circuits in a second embodiment of a remote-switch monitoring system;

Figure 8:
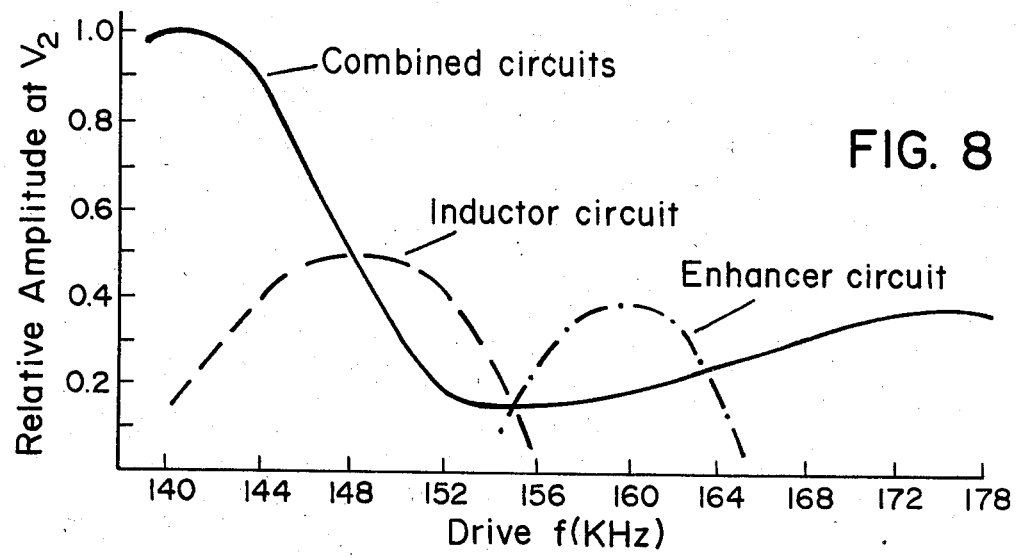
FIG. 8 is a plot, as a function of frequency, of the voltage response across capacitor 146 shown in FIG. 7 for the inductor circuit alone and the combined inductor and enhancer circuits in the FIG. 7 system, and across capacitor 178 for the enhancer circuit alone.
Figure 9:
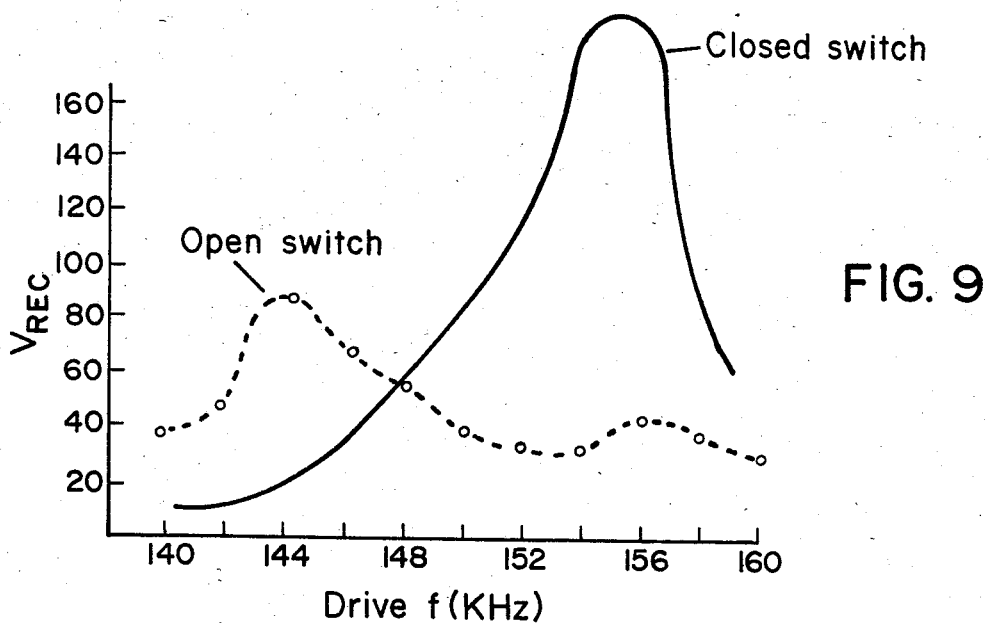
Figure 10:
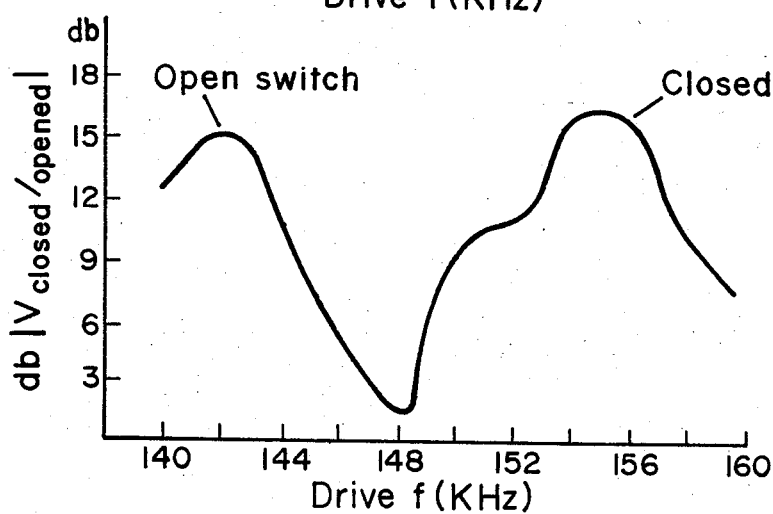

FIG. 9 is a plot of receiver voltage as a function of transmitter drive frequency in the FIG. 7 system, with the switch in the system either in a closed condition (solid lines) or an open condition (dashed lines); and FIG. 10 is a plot of the absolute value of the ratio of the two receiver signal voltages shown in FIG. 8, as a function of transmitter drive frequency.

DETAILED DESCRIPTION OF THE INVENTION

The system of the invention is designed for monitoring the condition of a switch carried on one of two remote members, to provide information about a physical condition in or on the member carrying the switch. The system will be described with particular reference to monitoring tire pressure in a vehicle tire.

FIG. 1 illustrates the arrangement of the components in a tire-pressure monitoring system, indicated generally at 10, which is constructed according to the present invention. The setting of the monitoring system, shown in FIG. 1, includes a tire 11 mounted on a rim 12 of a wheel 14. The wheel is carried rotatably on a hub 16 of a vehicle axle 18. Also seen in the figure is a portion of a wheel compartment of the vehicle, designated at 20, which is adjacent and confronting the inner side of wheel 14. The wheel compartment portion of the vehicle and the vehicle wheel are also referred to herein as remote members.

With reference to FIGS. 1-3, system 10 includes a transmitter 24, a receiver 26, an inductor circuit 28 and an enhancer circuit 30. The transmitter and receiver (also designated T and R, respectively) are carried on vehicle 20, as shown, and the inductor and enhancer circuits (also designated I and E, respectively) are carried preferably within the tire portion of wheel 14. Mounted on the inner sidewall of tire 11 is a 21 microhenry inductor coil 32 forming part of the inductor circuit 28, and a 2.3 microhenry inductor coil 34 forming part of the enhancer circuit 32. The construction and functioning of these two circuits including the coils therein will be described below.

With reference now to FIG. 2, transmitter 24 includes a 110 microhenry inductor coil 36 which is constructed and positioned in the system for magnetic-induction coupling with inductor and enhancer circuit coils 32, 34 as indicated in FIG. 3. Coil 36 preferably has a "pancake" type construction formed by planar, inwardly spiraling coil windings. The coil has a preferred outer diameter of about 1-3 inches and is placed on the vehicle a distance of up to one foot from the inductor and enhancer circuits carried on wheel 14.

The transmitter also includes an alternating-current, sine or square wave generator 38 which supplies its signal output, through a capacitor 40, to an LC resonance circuit loop composed of coil 36 and a 0.01 microfarad capacitor 42. The generator, which is also referred to herein as generator means, operates typically at a selected frequency between about 100 to 200 kilo-Hertz (kHz), and has a drive voltage of about 5 volts (rms). The generator signal supplied to the LC circuit loop in the transmitter creates an alternating current electromagnetic field which is inductively coupled to the inductor and enhancer circuit coils on the wheel. The inductor coil has a resonance peak preferably in the mid-operational frequency range of the generator, here about 150 kHz.

With continued reference to FIG. 3, inductor circuit 28 has a resonant circuit loop composed of inductor coil 32, a 270 microhenry inductor coil 44, and a 0.0034 microfarad capacitor 46. Coil 32 is formed of three circular windings of insulated No. 16 gauge wire, formed in an inwardly spiraling configuration and having an inner diameter of up to about 40 inches, or, in the case of a pancake coil, as small as 1 to 2 inches. The coil is mounted within the tire portion of the wheel, coaxially with respect to the wheel's rotational axis.

A switch element 48 in the inductor circuit functions to vary harmonic characteristics induced in the inductor circuit, according to the condition of a pressure-responsive switch contained in the switch element. FIG. 4 illustrates a switch element 48A for use in a system designed to monitor an upper-threshold pressure in tire 11. A pressure-responsive switch 50 in element 48A is an open/closed condition switch designed to assure open and closed switch conditions below and above a selected pressure threshold, respectively. One preferred type of pressure-responsive switch will be described below with reference to FIG. 6. Switch 50 is connected to a non-linear circuit element composed of two Schottky diodes 54 arranged in parallel and with opposite polarity. In the present embodiment, a 400 ohm parasitic resistance 52 also exists in series with switch 50, resulting from the type of switch used. The diodes function in a well-known way to clip a predominantly fundamental-frequency sine wave to produce higher-level harmonics in the inductor circuit. Under normal operating conditions, and with switch 50 in an open condition, inductive coupling between the transmitter and inductor circuit coils induces an alternating current signal in inductor coil 32 whose harmonic composition is substantially like that of the transmitter field. Closure of the switch at an above-threshold pressure level, places the non-linear Schottky diode elements in the inductor circuit loop, producing higher-level circuit harmonics, e.g., second and third harmonics, which are characteristic of the closed-switch condition only.

FIG. 5 shows a switch element 48B which is used in the inductor circuit in a system for monitoring a lower threshold pressure in tire 11. The resistor, switch and diode elements see in FIG. 5 are identical to those employed in switch element 48A. As seen in FIG. 5, switch 50 and a parasitic resistance 53 are connected in parallel to the two Schottky diodes, so that, with the switch in its open condition, the two diodes are connected in the circuit to produce higher-level harmonics as described above, and with the switch in its closed condition the diode elements are effectively shunted and do not appreciably effect the harmonic composition of the transmitter-induced signal in the inductor circuit. Thus, the higher-level harmonics will be present in the circuit only at a tire pressure below which the switch assumes an open condition. In both switch elements 48A and 48B, the diodes are also referred to herein as circuit components operatively connecting the switch to the inductor circuit loop to vary, according to the condition of the switch, the characteristics (harmonic composition) of the transmitter-induced signal in the inductor circuit.

The switch element in the inductor circuit, i.e., either element 48A or 48B, is connected in parallel to the inductor circuit loop across coil 44, as shown. The inductive reactance of coil 44 is in the range of the impedance of the switch element, so that a significant change in the Q-value of the inductor circuit occurs at the two different switch states. It is noted here that, in the simplest case, an open/closed condition switch (preferably with low resistance) could be placed directly in series or parallel with the coil 32, depending on the switch state which is to be monitored.

One of a number of different types of pressure-responsive switches may be employed. One preferred switch for use in the system of the invention includes a silicon diaphragm switch of the type illustrated in FIG. 6. The construction and operation of silicon-diaphragm switches of this type have been detailed in U.S. Pat. No. 4,543,457, entitled Microminiature Force-Sensitive Switch and assigned to the assignee of the present application. As described in that patent, a switch of this type is formed by silicon-wafer fabrication techniques which provide a number of advantages in terms of switch-component precision, size and ease of fabrication. Briefly, as shown in FIG. 6, switch 50 is formed by controlled etching of the opposite faces of a silicon wafer 55, to form a pressure-responsive diaphragm 56 having a typical thickness of between 10 and 100 microns, and hermetically sealing the wafer to a base 58 to form a sealed chamber 60 in the switch. A contact button 61 carried on the lower face of the diaphragm in the figure is adapted to make contact with an electrical pad 62 formed on the upper face of the base, upon the application of a threshold pressure applied in the direction of the arrow in FIG. 6, to close the switch. The switch and the inductor circuit components connecting the switch to the inductor coil 32 in the inductor circuit is preferably mounted within the tire portion of the wheel in FIG. 1.

Receiver 26 in the system, shown at the right in FIG. 2, has a resonance loop formed of a 110 microhenry inductor coil 70 and a 0.0012 microfarad capacitor 72, forming an LC circuit loop whose resonance characteristics are matched to a selected higher-order harmonic, e.g., the second harmonic (at three times the fundamental frequency), produced in the inductor coil, with the latter in a closed switch condition. The receiver coil is constructed and positioned with respect to coil 32 in the inductor circuit for inductive coupling between the two coils. Coil 70 preferably has the pancake type construction described above for coil 36. The coil has a preferred outer diameter of about 1-3 inches and is placed on the vehicle offset from and about 1 inch in front of coil 36. The planes of coils 36 and 70 are parallel to one another and to the planes of coils 32, 34 carried on wheel 14.

The harmonic signal induced in the receiver by coupling to coil 32 is fed to a monitoring circuit 74 in the receiver. This circuit is designed to detect a selected higher-order harmonic of the transmitter signal, and contains according to conventional design, a signal amplifier, a frequency-selective device such as a bandpass filter or a phase-lock loop, for selective passage or identification of the selected-harmonic signal being monitored, and an integrator and signal level switch responsive to a signal at a preselected threshold voltage level.

With continued reference to FIG. 2, the enhancer circuit in the system includes a resonance loop composed of coil 34, a 0.68 microhenry inductor coil 76 and a 0.47 microfarad capacitor 78, these components being selected to produce a desired resonance peak in the circuit. Coil 32, which is formed of a single circular winding of an insulated 16 Gauge wire, which as seen in FIG. 1, is substantially co-planar and coextensive with the 3-winding inductor circuit coil. The enhancer circuit coil is thus insulated from but strongly coupled magnetically to the inductor circuit coil. The enhancer circuit is tuned, by varying the inductance of coil 76 or the capacitance of capacitor 78, at or near a selected signal frequency which is induced in the inductor coil during operation of the monitoring system. This frequency may be the fundamental transmitter frequency induced in the inductor coil, with the inductor circuit switch in either its open or closed condition, or the selected higher-order harmonic signal which is produced in the inductor circuit with the switch in its closed condition and monitored by receiver 26. Coil 76 and capacitor 78 are also referred to herein, collectively, as means for producing signal-enhancing resonance characteristics in the enhancer circuit.

According to an important feature of the invention, the enhancer circuit functions in system 10 to increase the signal voltage induced in the receiver circuit coil, at a selected transmitter signal frequency, over that producible in the receiver coil in the absence of the enhancer circuit. The functioning of the enhancer circuit can be understood as follows. When the enhancer circuit is tuned to respond to the fundamental induced circuit frequency, the transmitter field acts to induce fundamental-frequency signals in both the inductor and enhancer circuits. Strong coupling between the two circuits allows reradiation of the enhancer circuit signal to the inductor circuit to increase its signal voltage. This enhances the signal voltage of higher-level harmonics induced in the receiver when the switch is in a closed condition. Experiments conducted in support of the present application confirm that the induced signal voltage in the receiver is substantially higher with the inductor/enhancer circuit configuration than with the inductor circuit alone. The observed enhancement is seen regardless of whether the inductor circuit contains a 3- or a 4-loop inductor coil; i.e., the enhancement effect is not due merely to the presence of an additional coil winding carried in the tire.

In other experiments conducted in support of the application, it was found that even greater enhancement of the receiver signal voltage can be achieved by tuning the enhancer circuit at or near a selected harmonic frequency of the transmitted signal. For example, it was found that by tuning the enhancer circuit to the third harmonic frequency of the transmitted signal, the receiver voltage signal level was increased about 6 decibels (db) over the already-enhanced value observed when the enhancer circuit is tuned to the transmitter signal frequency. In the latter mode of operation, where the enhancer circuit is tuned to a selected higher-order harmonic frequency, the circuit acts to receive and reradiate the harmonic signal from the inductor coil, to enhance the signal voltage induced in the receiver.

FIG. 3 illustrates very diagramatically the operation of the tire pressure monitoring system described above. The transmitter field from the vehicle-mounted transmitter coil induces, by magnetic coupling, an alternating current signal in the inductor circuit, and where the enhancer circuit is tuned to the transmitter field frequency, also in the enhancer circuit. At a selected pressure threshold level, the inductor circuit is placed in a condition in which the higher-order harmonics of the transmitter signal are generated. The selected-frequency harmonic signal is picked up by inductive coupling in the receiver, to signal a change in the tire pressure condition. The voltage level of the higher-order harmonic induced in the receiver is enhanced by the enhancer circuit, which may be tuned either to the transmitter frequency or to a higher-order harmonic, by inductive interaction between the inductor and enhancer circuit coils. It will be appreciated that, in the usual situation, each tire of a vehicle will be equipped with its own pressure monitoring system of the type just described. It is noted here that both inductor coil 36 and receiver coil 70 are positioned "below", i.e., within the circular boundaries of, coils 32, 34 in tire 11.

FIG. 7 illustrates a remote switch-sensing system 80 constructed according to a second embodiment of the invention. This system includes a transmitter 82, a receiver 84, an inductor circuit 86, and an enhancer circuit 88, each of which has the general construction and mounting configuration of their corresponding counterparts in above-described system 10. System 80 differs from above-described system 10 functionally in that the enhancer and inductor circuits carried on the vehicle wheel interact in a manner which leads to induction of a first receiver signal peak, in one switch state of the inductor coil and at one transmitter signal frequency, and to a second receiver signal peak at the other switch state and at another transmitter signal frequency. The system is thus able to monitor, by a positive receiver signal response, both open and closed conditions of the pressure-responsive switch in the inductor circuit. The constructional features of system 80 which are different from those of system 10, and the operational features which permit system monitoring at both switch states will now be considered.

For purposes of simplicity, the components in the system 80 circuits which are substantially identically to corresponding components in the system 10 circuits are designated with three digit numbers whose first digits correspond to the number designating the corresponding component in system 10 (FIG. 2) and whose third digit is 1. Thus, in transmitter 82, coil 136 is the same as coil 36 in transmitter 24 in FIG. 2.

As seen from a comparison of FIGS. 2 and 7 transmitter 82 is identical to transmitter 24, being operable for sine or square wave signal generation preferably in the range between about 100 and 200 kHz. Receiver 84 differs from receiver 26 only in that the coil circuit is tuned to a resonance peak which is closely matched to a middle-range frequency of the transmitter, e.g., 150 kHz, rather than to a higher-harmonic frequency of the transmitter signal as in receiver 26. To this end, a 0.01 microfarad capacitor 90 is substituted for capacitor 72 in system 10.

The inductor circuit includes coil and capacitor components identical to those in the system 10 inductor circuit, giving a "natural" resonance frequency in the circuit loop of about 148 kHz. The term "natural" resonance frequency is defined herein, for both the inductor and enhancer circuits, as the resonance frequency of each circuit in the absence of inductive coupling with other wheel-mounted circuits. A switch element 92, which is connected across coil 144 in the inductor circuit, includes a pressure-responsive switch 150 connected in series to a 400-ohm resistor 94. With the switch in an open condition, as shown in the figure, the inductor circuit is in a high-Q mode, characterized by a relatively narrow-band frequency response peak centered at around 148 kHz. Closure of switch 150 places the circuit in a low-Q mode characterized by a low amplitude signal which is relatively flat over the operating frequency range of the transmitter, which is, in the present embodiment, between about 140 and 180 kHz. Resistor 94 thus serves as a circuit component operatively connecting switch 50 to the inductor circuit loop to vary, according to the condition of the switch, the Q-characteristics of the transmitter-induced signal in the inductor circuit.

Enhancer circuit 88 in system 80 is substantially identical to that described in system 10. The circuit is tuned to a resonance frequency which is offset at least about 5% from the resonance frequency of the inductor circuit with such in its open-switch, high-Q mode. In the present example, where the inductor coil is tuned to about 148 kHz, the enhancer circuit has a natural resonance frequency at about 160 kHz. Coil 176 and capacitor 178 are also referred to herein as means for producing desired resonance characteristics in the enhancer circuit. The coil construction and arrangement with respect to the inductor circuit coil is substantially identical to what has been described above with reference to system 10.

As indicated above, an important operational feature of system 80 is the ability to induce selected-frequency voltage signals in the receiver at each switch state in the inductor coil. This operational feature can be understood with reference to FIGS. 8 and 9 which show frequency-dependent signal characteristics of various circuit and circuit combinations in the system. In FIG. 8, the signal voltage across capacitor 146 induced in the inductor circuit alone, in its switch-open, low-Q mode, and by the enhancer circuit alone across capacitor 178 are shown in dashed and dash-dot lines, respectively, in the frequency range between 140 and 176 kHz. As seen, the open-switch inductor circuit and the enhancer circuit individually have natural resonance-frequency peaks at about 148 and 160 kHz, respectively. The solid line plot in FIG. 8 shows the frequency-dependent voltage induced at capacitor 146 by the combined open-switch inductor circuit and enhancer circuit. The plot demonstrates that the two circuits in combination act to split the individual-circuit resonance peaks into two more widely spaced peaks centered at about 140 and about 174 kHz. The peak splitting observed in the combined inductor/enhancer circuits is analogous to that observed in a double-tuned transformer, where mutual inductance between two coupled coils in the transformer produces increasing peak splitting as the two coils are tuned further apart. It is noted that this phenomenon places a restriction on how closely the inductor and enhancer circuits can be tuned, since the peak splitting will become quite small for closely tuned circuits, and differentiation of the switch-on and switch-off states of the inductor coil, which is based on this peak splitting, will become more difficult. The two circuits are preferably tuned to within about 5 to 15% of one another.

FIG. 9 is a plot of receiver signal voltage as a function of transmitter drive frequency, with the inductor circuit switch either in its closed (solid line) or open (dashed line) condition. As seen here, the receiver signal has a voltage peak at about 154–156 kHz with the inductor circuit in its closed-switch low-Q mode, and at about 144 kHz with the inductor circuit in its open-switch high-Q mode. It is noted here that the receiver used in producing the FIG. 9 data contained a 150 kHz band pass filter which acted to shift both the lower- and higher-frequency peaks toward 150 kHz.

Experiments conducted in support of the present invention indicate that the voltage and frequency dependence of the receiver signal, with the system in its low-Q, closed-switch condition, closely follows that of the enhancer circuit alone, (dash-dot line in FIG. 8). This suggests that the higher-frequency signal is due predominantly to the enhancer circuit alone, and that the inductor circuit in its closed-switch, low-Q condition is essentially silent at the higher-frequency receiver response peak. The shift of the peak signal response of the enhancer circuit from 160 kHz, as seen in FIG. 8, to a peak centered between 154 and 156 kHz is, as indicated above, due to the band pass filter in the receiver.

The open-switch frequency dependent signal response (dashed line in FIG. 9) is, of course, just the split-peak signal response seen (solid line) in FIG. 8 for the combined inductor and enhancer circuits. The two peaks at 140 and 172 kHz in FIG. 9 have been shifted to about 144 and 168 kHz by the band pass filter in the receiver. The peak at 144 kHz is seen in FIG. 9.

In FIG. 10, the absolute value of the difference between the closed-switch to open-switch voltage levels, referred to herein as the signal-to-noise ratio, is plotted, as a function of frequency, on a decibel scale. The signal-to-noise ratio peaks may also be thought of as closed switch to open switch ratio peaks. The plot shows that the signal-to-noise ratio peaks for detecting open and closed-switch conditions of the system occurs at about 142 and 154 kHz, respectively. At both switch conditions, signal-to-noise ratio peaks of at least about 15 db were observed.

The system may be operated in a manner which provides monitoring of each of the two system switch states, by alternately and recurrently probing the wheel-mounted circuits with each of the two selected transmitter frequencies, i.e., 142 and 154 kHz at which open- and closed-condition signal-to-noise ratio peaks are produced in the receiver. By way of example, in a system designed for monitoring loss of tire pressure below a selected threshold level, the transmitter is periodically and alternately switched between the lower and higher probe frequencies, with the receiver signal confirming at the higher frequency that the system is still operational, and that the switch is still in a closed condition, and at the lower frequency, confirming that the switch has not assumed an open condition indicative of a critical loss of tire pressure. Alternatively, the system may, like system 10 above, be operated in a single-frequency mode in which the transmitter frequency is set at either of the two signal-to-noise ratio peak frequencies, and the receiver is set to provide a warning to the vehicle operator on any change in the signal level at that frequency.

From the foregoing, it can be appreciated how various objects and advantages of the present invention are achieved. The invention provides, in the case of the first-described embodiment, a system which operates to enhance signal level voltage induced in a receiver, increasing the reliability and sensitivity of the system to changes in switch state. In this embodiment, the enhancer circuit is tuned to interact inductively with the inductor circuit either at the transmitter field frequency or at a higher-order harmonic thereof. The second embodiment of the invention, in addition to providing the same enhancing of signal strength, also provides the important advantage that the two conditions of the switch can each be monitored independently, by positive signal detection at both open and closed switch conditions in the system.

While preferred embodiments of the invention have been described herein, it will be appreciated that various changes and modifications may be made without departing from the scope of the invention. In particular, although the monitoring system has been described herein with reference to tire pressure monitoring, it will be appreciated that the general concepts of the invention are applicable to a variety of remote-switch sensing uses.

What is claimed is:

1. A system for monitoring an open/closed condition switch carried on one of a pair of remote members, said system comprising a transmitter mounted on the other remote member, including a transmitter coil which is positioned adjacent the one remote member, and means for coupling an alternating current to said coil, such that a selected-frequency electromagnetic field is generated thereby, an inductor circuit carried on the one remote member, including an inductor coil operatively positioned adjacent the transmitter coil during operation of the system, and a switch element including such open/closed condition switch and circuit components operatively connecting the switch to the inductor-circuit coil to vary, according to the condition of the switch, the characteristics of a signal induced in the circuit by magnetic coupling between the transmitter and circuit coils, when the transmitter is generating such selected-frequency field, a receiver mounted on the other remote member, including a coil positioned for magnetic coupling to the inductor-circuit coil during operation of the system, and a monitoring circuit for detecting the signal response voltage in the inductor circuit according to a signal produced in the receiver coil by inductive coupling with the inductor circuit coil, and an enhancer circuit carried on the one remote member, including an inductor coil magnetically coupled to the inductor-circuit coil, and circuit means for producing resonance characteristics in the enhancer circuit which act to increase the signal voltage produced in the receiver circuit coil at a selected signal frequency, over that producible in the receiver circuit coil in the absence of the enhancer circuit.

2. The system of claim 1, for use in monitoring the pressure of a vehicle tire carried on a wheel, where the wheel and the vehicle are the one and the other members, respectively, the inductor and enhancer circuits are carried on the wheel, and said switch includes a pressure-responsive open/close condition switch.

3. The system of claim 2, wherein a selected change in said switch from one condition to another produces additional signal harmonics in the inductor circuit signal, when such is carrying a signal induced by the transmitter, and wherein the receiver is tuned to detect one of such harmonics.

4. The system of claim 3, wherein the enhancer circuit is tuned approximately to the transmitter signal frequency.

5. The system of claim 3, wherein the enhancer circuit is tuned approximately to the frequency of one of such harmonics induced in the inductor coil.

6. The system of claim 3, wherein the said circuit components in the switch element include a pair of diodes arranged in parallel and having opposite polarity.

7. The system of claim 6, for use in monitoring tire pressure threshold, wherein said switch is connected in series to said diodes.

8. The system of claim 6, for use in monitoring a lower-threshold tire pressure, wherein said switch is connected in parallel to said diodes.

9. The system of claim 1, wherein the inductor and enhancer circuits are constructed to induce receiver signals which have a first signal-to-noise ratio peak at one transmitter field frequency, when said switch is in its closed condition, and a second signal-to-noise ratio peak at another transmitter field frequency, when said switch is in its open condition.

10. The switch of claim 9, wherein the enhancer circuit natural resonance frequency is tuned to a range within about 5 to 15% of the natural resonance of the inductor circuit.

11. The system of claim 10, wherein the enhancer circuit has a higher natural resonance frequency than the inductor circuit, and such first signal is produced at a higher transmitter frequency than the second.

12. The system of claim 2, wherein the inductor and enhancer circuit coils are substantially parallel planar and coextensive.

13. The system of claim 12, wherein the inductor and enhancer coils are coaxial with respect to the rotational axis of said wheel.

14. The system of claim 2, wherein said switch includes a silicon diaphragm switch which is adapted to assume a closed condition above a selected pressure level.

15. A system for monitoring the pressure in the tire of a vehicle wheel comprising
a transmitter mounted on the vehicle, including a transmitter coil positioned adjacent such vehicle wheel, and an alternating-current signal generator for generating selected-frequency alternating current electromagnetic fields in said coil,
an inductor circuit carried on the wheel for rotation therewith, including an inductor coil operatively positioned adjacent the transmitter coil, and a switch element including a pressure-responsive, open/closed condition switch operatively connected to the inductor-circuit coil to vary the Q characteristics of the circuit according to the switch condition,
a receiver mounted on the vehicle, including a coil positioned for magnetic coupling to the inductor circuit coil, and a monitoring circuit for detecting signal voltage in the inductor circuit according to a signal produced in the receiver coil by inductive coupling with the inductor circuit coil, and
an enhancer circuit carried on the wheel for rotation therewith, including an inductor coil which is magnetically coupled to the inductor circuit coil, and circuit means for producing resonance characteristics in the enhancer circuit which produce, through coupling to the inductor circuit coil, receiver signals which have a first signal-to-noise ratio peak, at one transmitter field frequency, with the switch element in its closed condition, and a second signal-to-noise ratio peak at a second transmitter field frequency, with the switch element in its open condition.

16. The system of claim 15, wherein the enhancer circuit natural resonance frequency is tuned to a range within about 5 to 15% of that of the natural resonance of the inductor circuit, with such in a closed-switch condition.

17. The system of claim 16, wherein the enhancer circuit has a higher natural resonance frequency than the inductor circuit, and such first signal-to-noise ratio peak is produced at a higher transmitter frequency than the second.

18. The system of claim 16, wherein the transmitter field frequency is above about 100 kHz, and the first signal-to-noise ratio peak occurs at a frequency which is between about 5 and 15% within that of the second signal-to-noise ratio peak.

19. The system of claim 15, for use in monitoring a low and/or high pressure threshold in the tire, wherein said switch is adapted to assume a closed condition at such high-pressure threshold and an open condition at such low-pressure threshold.

20. The system of claim 19, wherein such switch includes a silicon diaphragm switch.

21. The system of claim 15, wherein the inductor and enhancer circuit coils are substantially circumferential, coextensive, and coaxial with respect to the rotational axis of such wheel.

22. The system of claim 21, wherein the inductor and enhancer circuit coils include 3 and 1 circumferential windings, respectively, and have an inductance ratio of about 9:1.

* * * * *